United States Patent
Bostick et al.

(10) Patent No.: US 9,635,079 B1
(45) Date of Patent: Apr. 25, 2017

(54) SOCIAL MEDIA SHARING BASED ON VIDEO CONTENT

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/938,996

(22) Filed: Nov. 12, 2015

(51) Int. Cl.
| | |
|---|---|
| G06F 15/16 | (2006.01) |
| H04L 29/06 | (2006.01) |
| G06K 9/46 | (2006.01) |
| H04L 12/58 | (2006.01) |

(52) U.S. Cl.
CPC ............ *H04L 65/4084* (2013.01); *G06K 9/46* (2013.01); *H04L 51/32* (2013.01); *H04L 65/403* (2013.01)

(58) Field of Classification Search
CPC ... H04L 51/32; H04L 65/4084; H04L 65/403; G06K 9/46
USPC .......................................................... 709/204
See application file for complete search history.

(56) References Cited

U.S. PATENT DOCUMENTS

| | | | |
|---|---|---|---|
| 6,496,981 B1 | 12/2002 | Wistendahl et al. | |
| 7,720,436 B2 | 5/2010 | Hamynen et al. | |
| 7,809,499 B2 | 10/2010 | Maekawa et al. | |
| 7,886,327 B2 | 2/2011 | Stevens | |
| 8,397,264 B2 | 3/2013 | Ansari et al. | |
| 8,416,262 B2 | 4/2013 | Saunders | |
| 8,730,354 B2 | 5/2014 | Stafford et al. | |
| 8,769,584 B2 | 7/2014 | Neumeier et al. | |
| 9,069,794 B1* | 6/2015 | Bandukwala | ..... G06F 17/30256 |
| 2009/0052863 A1* | 2/2009 | Parmar | ................ G11B 27/034 386/323 |

(Continued)

FOREIGN PATENT DOCUMENTS

WO    0167752 A2    9/2001

OTHER PUBLICATIONS

Ishii, Hiroshi; "Toward an Open Shared Workspace: Computer and Video Fusion Approach of Team WorkStation"; NTT Human Interface Laboratories; Kanagawa, Japan; Position Paper for ECSCW '91 Workshop on Open CSCW Systems; 1991, pp. 1-2.

(Continued)

*Primary Examiner* — Richard G Keehn
(74) *Attorney, Agent, or Firm* — Isaac J. Gooshaw

(57) ABSTRACT

A method, computer program product and computer system is provided. A processor identifies a first content of a user-generated media, wherein the user-generated media includes an image file. A processor identifies a second content of a content-provider media, wherein the content-provider media includes one or both of a broadcast stream and an on-demand video file. Responsive to a determination that the first content of the user-generated media and the second content of the content-provider media share at least one feature, a processor sends a notification of the user-generated media to a user that is viewing the content-provider media. Responsive to receiving an indication of approval from the user in response to the notification, a processor sends to the user an indication of access for the user-generated media.

14 Claims, 4 Drawing Sheets

(56) References Cited

U.S. PATENT DOCUMENTS

| | | | | |
|---|---|---|---|---|
| 2009/0052870 | A1* | 2/2009 | Marsh | H04N 7/17318 386/292 |
| 2009/0164310 | A1* | 6/2009 | Grossman | G06Q 20/3224 705/7.33 |
| 2010/0049608 | A1* | 2/2010 | Grossman | G06Q 30/02 709/203 |
| 2011/0279311 | A1 | 11/2011 | Hamano | |
| 2012/0096491 | A1 | 4/2012 | Shkedi | |
| 2012/0306891 | A1* | 12/2012 | Shaffer | G06T 13/00 345/473 |
| 2013/0018881 | A1* | 1/2013 | Bhatt | G06F 17/30241 707/736 |
| 2014/0006129 | A1* | 1/2014 | Heath | G06Q 30/0222 705/14.23 |
| 2014/0020018 | A1 | 1/2014 | Narasimha | |
| 2015/0304437 | A1* | 10/2015 | Vaccari | G06F 1/3215 709/204 |
| 2016/0050283 | A1* | 2/2016 | Azose | H04L 67/18 709/203 |

OTHER PUBLICATIONS

"Digital and Mobile TV to Dominate Growth in Entertainment Spending"; Advertising Age; Published on: Jun. 5, 2013; © 1994-2015; pp. 1-4.

"Dongle for TV Location Identification and Advertisement Insertion"; An IP.com Prior Art Database Technical Disclosure, IPCOM000236792; May 15, 2014; pp. 1-38.

"IAB Analysis Shows Travel-Seeking Audience Spending More Time Online & Having Stronger Mobile Usage Habits than Average Americans"; IAB; Sep. 13, 2012; © Interactive Advertising Bureau, 2015; pp. 1-3; <http://webcache.googleusercontent.com/search?q=cache:jE-xwn9xyPYJ:www.iab.net/about_the_iab/recent_press_releases/press_release_archive/pres>.

"Method and Apparatus for Integrating Online Social Media in TV as a Service"; An IP.com Prior Art Database Technical Disclosure, IPCOM000197674; Jul. 19, 2010; pp. 1-3.

"Method and System for Recommending Travel Destinations based on Predictive Television (TV) Viewing Data Analysis";An IP.com Prior Art Database Technical Disclosure, IPCOM000240978; Mar. 16, 2015; pp. 1-3.

* cited by examiner

SOCIAL MEDIA SHARING BASED ON VIDEO CONTENT

BACKGROUND OF THE INVENTION

The present invention relates generally to the field of media file sharing, and more particularly to sharing media files during video playback.

Video playback is the viewing of information in a video format on a device. This may include set-top boxes or dedicated devices for viewing video. This may also include other generalized hardware such as a personal computer or smartphone. Video may be delivered via various mechanisms such as a broadcast format or on-demand format. Typically, a user views only one video source at a time. However, in some instances, a user may view multiple videos at a time.

SUMMARY

Embodiments of the present invention provide a method, system, and program product to provide a notification of user-generated media. A processor identifies a first content of a user-generated media, where the user-generated media includes an image file. A processor identifies a second content of a content-provider media, where the content-provider media includes a broadcast stream or an on-demand video file. In response to a determination that the first content of the user-generated media and the second content of the content-provider media share at least one feature, a processor sends a notification of the user-generated media to a user, where the user is viewing the content-provider media. In response to receiving an approval of the notification from the user, a processor sends the user-generated media to the user that includes an indication of access to the user-generated media.

DETAILED DESCRIPTION

Figure 1:
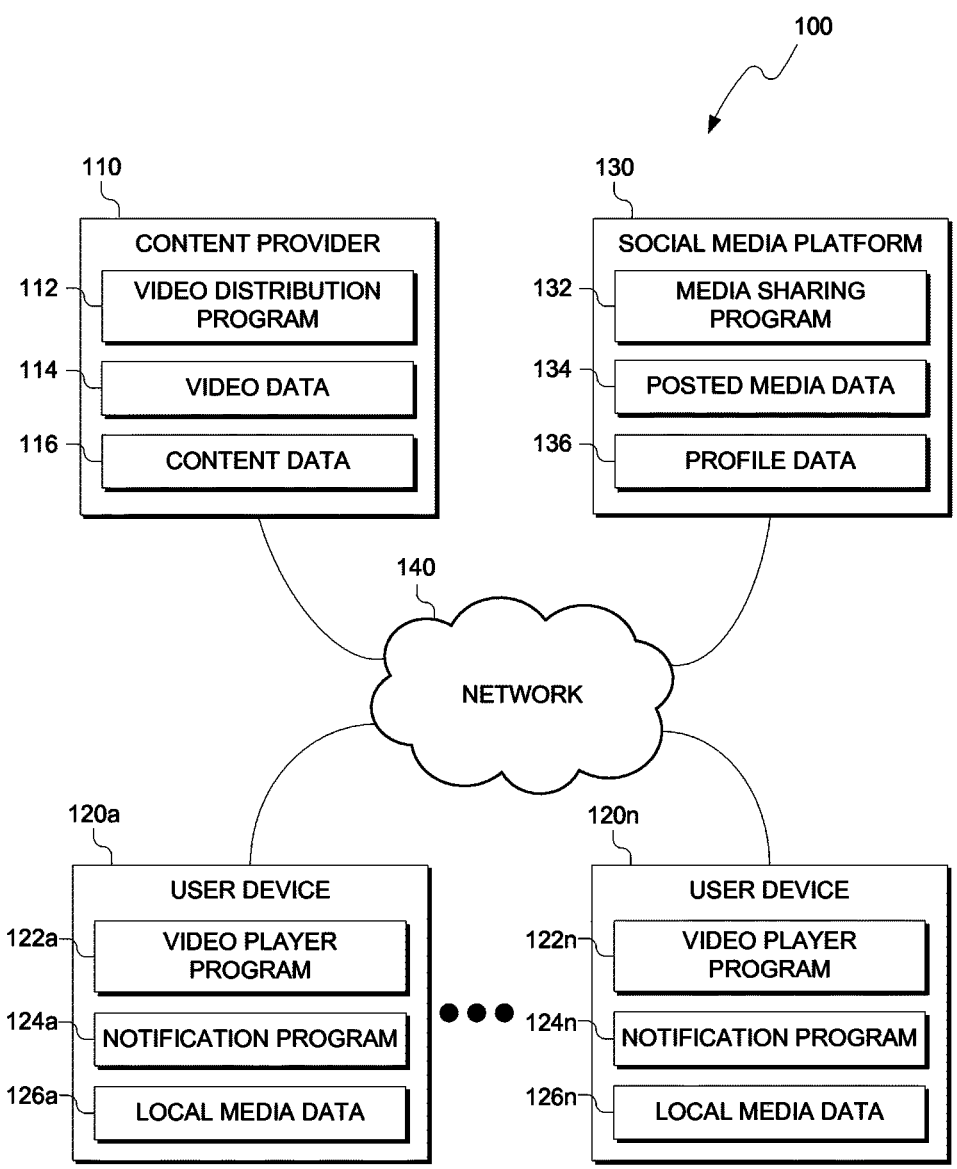
FIG. 1 is a functional block diagram illustrating a networked environment, in accordance with an exemplary embodiment of the present invention.

While solutions to sharing social media are known, they typically are shared upon immediate availability to a social media platform. For example, after a user uploads an image, the social media platform immediately shares the image with a group associated with the user (e.g., followers or family members). Embodiments of the present invention recognize that by analyzing other available content, shared social media can be presented to a user when the content and the social media share one or more features, such as similar locations or objects. For example, a user has vacation photos stored on a social media platform. When a friend of the user is watching a video documentary about the location where the vacation took place, a notification is displayed to the friend of the user with images or previews of the shared images taken from the user's vacation.

Social media includes a variety of tools that allow people to create, share or exchange information, ideas, picture, or videos with individuals, communities, groups, or other types of networks. Social media is based on the creation and exchange of user-generated content. When a user creates a piece of social media content, the user selects the individuals or groups to share the content within a platform. Social media platforms take on many different forms including blogs, business networks, enterprise social networks, forums, microblogs, photo sharing, products/services review, social bookmarking, social gaming, social networks, video sharing and virtual worlds.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes content provider 110, user devices 120a-n and server 130 connected over network 140. Content provider 110 includes video distribution program 112, video data 114, and content data 116. User devices 120a-n (collectively referred to as user devices 120) each include respective video player programs 122a-n (collectively referred to as video player programs 122), notification program 124a-n (herein collectively referred to as notification programs 124), and local media data 126a-n (collectively referred to as local media data 126). Social media platform 130 includes media sharing program 132, posted media data 134, and profile data 136.

In various embodiments of the present invention, content provider 110, user devices 120 and social media platform 130 are each computing device that can be a standalone device, a server, a laptop computer, a tablet computer, a netbook computer, a personal computer (PC), or a desktop computer. In another embodiment, content provider 110, user devices 120 or social media platform 130 each represent a computing system utilizing clustered computers and components to act as a single pool of seamless resources. In general, content provider 110, user devices 120 or social media platform 130 can be any computing device or a combination of devices with access to video data 114, content data 116, local media data 126, posted media data 134, and profile data 136 and is capable of executing video distribution program 112, video player programs 122, notification programs 124, media sharing program 132. Content provider 110, user devices 120 or social media platform 130 may include internal and external hardware components, as depicted and described in further detail with respect to FIG. 3.

In this exemplary embodiment, video distribution program 112, video data 114, and content data 116 are stored on content provider 110. Video player programs 122, notification programs 124, and local media data 126 are stored respectively on user devices 120. Media sharing program 132, posted media data 134, and profile data 136 are stored on social media platform 130. However, in other embodiments, video distribution program 112, video data 114, content data 116, video player programs 122, notification programs 124, local media data 126, media sharing program 132, posted media data 134, and profile data 136 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between content provider 110, user devices 120 and social media platform 130, in accordance with a desired embodiment of the present invention.

In various embodiments, content provider 110 includes video distribution program 112 that sends video data 114 to one or more users. Video data 114 includes one or more prerecorded videos, such as, but is not limited to, video-on-demand, or live feeds, such as broadcast channels. In some embodiments, video data 114 includes images, audio or any type of media. User devices 120 each include a video player program (e.g., video player program 122a) that receives video data 114 for display to a user. In some embodiments, a user device (e.g., user device 120a) is a set-top box or other device connected to a display, such as a television. In other embodiments, a user device (e.g., user device 120a) includes a display, such as a smart television (TV) or smartphone. The video player program for a user device (e.g., video player program 122a of user device 120a) receives input from a user to view content of video data 114 from content provider 110. For example, a user changes channels or selects a video offered by an on-demand service provided by content provider 110.

As a non-limiting example scenario of video content distribution, content provider 110 is operated by a cable company offering a variety of channels (e.g., video data 114) to customers. The cable company distributes a feed of all the channels to the customers. The customers each have a set-top box (e.g., user devices 120) for viewing the channels offered by the cable company. The set-top box receives input from a user to select a channel for viewing. The set-top box filters the feed to select the desired channel and sends to a video signal of the channel to a connected television for display. In this example, video data 114 is broadcasted to computing device 120, with user devices 120 determining the content to display. In other scenarios, video data 114 may be selectively sent to user devices 120. For example, content provider 110 may be an internet protocol television (IPTV) provider or other server sending packets of information containing video data 114. One of ordinary skill in the art will appreciate that any system of content distribution may be used by a provider without deviating from the invention. Additionally, while not shown for simplicity, more than one content provider may be connected to network 140. A video player program for a user device (e.g., video player program 122a of user device 120a) is configured to receive the respective video data 114 of each content provider 110 as discussed herein. In some embodiments, content provider 110 acts as an intermediary for a content producer. For example, a broadcast television station sends a live broadcast to content provider 110. Content provider 110 sends the broadcast to computing device 120. In such embodiments, content provider 110 may not store video data 114 and content data 116 locally and receive the data from a content producer for distribution.

In various embodiments, content provider 110 includes content data 116. Content data 116 describes the content of video data 114. In some embodiments, content data 116 describes the overall content of a video. In some embodiments, content data 116 describes an characteristic associated with the content of a video. For example, content data 116 includes the location of a movie offered in video data 114 was filmed. In other embodiments, content data 116 includes the timing and appearance of landmarks (e.g., the Grand Canyon appears 15 minutes into the video), locations (e.g., a first act of a movie is shot in a specific city in Europe), objects (e.g., a cruise ship is shown at the five minute mark), or locales (a beach appears during the last scene) that appear in a respective video in video data 114.

In some embodiments, at least one of i) a content producer and ii) an administrator of content provider 110 provides content data 116 for content supplied to content provider 110. For example, the content producer provides data about the locations, landmarks, objects and locales captured in a video and in some embodiments, the times the content appear in the video. For live content, a content producer or an administrator of content provider 110 provides content data 116 for events as they occur. For example, in a cross-country race, an administrator updates the current location the race participants are located or the position of the cameras used to broadcast the race. In some scenarios, content data 116 may be included in video data 114 (e.g., metadata is included in a video stream of video data 114). For example, when video data 114 was captured the geographical coordinates of where the video was captured are stored as metadata along with video data 114.

In other embodiments, video distribution program 112 analyzes content in video data 114 to determine content data 116. For example, video distribution program 112 performs machine vision techniques and processes to determine landmarks captured in a video of video data 114. Video distribution program 112 includes a variety of images of famous landmarks. Video distribution program 112 compares the images of landmarks to captured footage of video data 114. If content included in the frames of the video match the images of a landmark, then video distribution program 112 determines the times the landmark appears in the video, and stores the information in content data 116. In some scenarios, video distribution program 112 performs content-based image retrieval (CBIR) to video data 114 determine the content or subjects captured in video data 114. Video distribution program 112 includes various images of known subject or content. Video distribution program 112 compares the images with known subjects to frames of video data 114. When a match between a frame and a known images occurs through CBIR, then video distribution program 112 determines the content data 116 associated with the frames of video data 114 matching the known image to be the subject or content contained in the known image. Techniques for identification of subject matter is known and understood by those skilled in the art. As such, an extensive description of such known techniques exceed the scope of the present invention. Ones skilled in the art recognize that many types of image analysis technique can be applied such that the content of an image is identified. Therefore, one skilled in the art recognizes that an embodiment can incorporate one or more of such image analysis techniques without deviation from the spirit of the invention.

In various embodiments, social media platform 130 includes a media sharing program 132 for users of social media platform 130 to share various types of user-generated media. For example, social media platform 130 is an image sharing website where users post images they have taken. As another example, social media platform 130 is a social network where users gather to discuss topics and also share media (e.g., images, videos and the like). Social media platform 130 includes media sharing program 132. Media sharing program 132 provides users with the ability to upload and share user-generated media with other users of social media platform 110. Media sharing program 132 stores user-generated media in posted media data 134.

In various embodiments, posted media data 134 includes user-generated content, such as, for example, images captured by users. In some scenarios, user-generated content includes metadata indicating the location an image was captured. For example, an image is captured and stored using the exchangeable image file format (EXIF). An EXIF image includes metadata of the geographical location of the device that captured the image. In other scenarios, when posting media to social media platform 130, media sharing program 132 receives input from a user indicating the content. For example, a user may select a tag indicating the location, landmarks, objects, or locales included in the image. In various embodiments, social media platform 130 includes profile data 136 for the users of the platform. Profile data 136 includes information indicating the various users (e.g., name, hometown, etc.). Additionally, each profile in profile data 136 includes friends of each user or a membership of the user in one or more groups. In some embodiments, posted media data 134 includes video captured by users of social media platform 130. In such scenarios, captured video may also include metadata, tags or descriptions to determine the location the video was captured at or the content or subjects captured in the video. In various embodiments, media sharing program 132 performs content-based image retrieval (CBIR) to determine the content or subjects of an image or video. Rather than using metadata, descriptions, and the like, media sharing program 132 performs CBIR by comparing known images of content or subjects to posted media data 134 to determine the content of the video or images. When a match occurs, media sharing program 132 identifies the content of the matching posted media data 134 to be the subject or content in the known image that caused the match.

In various embodiments, user devices 120 each include a video player program (e.g., video player program 122a). Video player programs 122 display the selected video data 114 by a user (e.g., view a television channel or watch a video on demand). As a video player program (e.g., video player program 122a) displays video data 114, the respective notification program (e.g., notification program 124a) compares content data 116 associated with the displayed video in video data 114 to posted media data 134 associated with friends or groups of the user on social media platform 130, as indicated by a profile of the user stored in profile data 136. In some embodiments, the respective notification program (e.g., notification program 124a) compares content data 116 associated with the displayed video in video data 114 to the respective local media data (e.g., local media data 126a). Local media data 126 includes media, such as images captured by the user, similar to user-generated content stored on posted media data 134 of social media platform 130.

In various embodiments, if content data 116 of a currently displayed video on a user device (e.g., user device 120a) matches content of posted media data 134, then the respective notification program (e.g., notification program 124a) displays a notification including the user-generated content matching the content of the video. In some embodiments, notification programs 124 compare user-generated content from all users of social media platform. In other embodiments, notification programs 124 compare user-generated content from users indicated as friends or a member of a group the user belongs to as indicated by profile data 136. For example, a user is watching a television program about vacation home buyers (e.g., video data 114 of content provider includes a broadcast of the television program or a video-on-demand of the program). The particular episode is about vacation homes in an island country. A friend of the user, as indicated by profile data 136, has posted user-generated images of the friend's vacation on that island country. Notification program 124a compares received content data 116 of the television program to posted media data 134. Notification program 124a determines that the content of the friend's vacation photographs (e.g., metadata included with the images indicate the location the photos were taken) match the content of the television show (e.g., content data 116 includes a description of the location the episode is about). In response to the matching content between both the user-generated content and the video of the content provider currently displayed, notification program 124a generates a notification indicating the matching image taken by the user's friend.

In some embodiments, the respective notification program (e.g., notification program 124a) sends an instruction or command to the respective video player program (e.g., video player program 122a) to display the notification as an overlay. For example, the respective video player program (e.g., video player program 124a) displays a heads-up notification over the currently displayed video data 114 with the content matching the user-generated content. The respective video player program (e.g., video player program 124a) displays the notification that includes a preview of the user-generated content (e.g., a thumbnail image) and a description of the notification (e.g., the name of the user who posted the user-generated content). In other embodiments, the respective notification program (e.g., notification program 124a) of the respective user device (e.g., user device 120a) sends a notification to a program executing on another device (not shown). For example, notification program 124a sends a notification to a program executing on a smartphone associated with the user of user device 120a.

Figure 2:
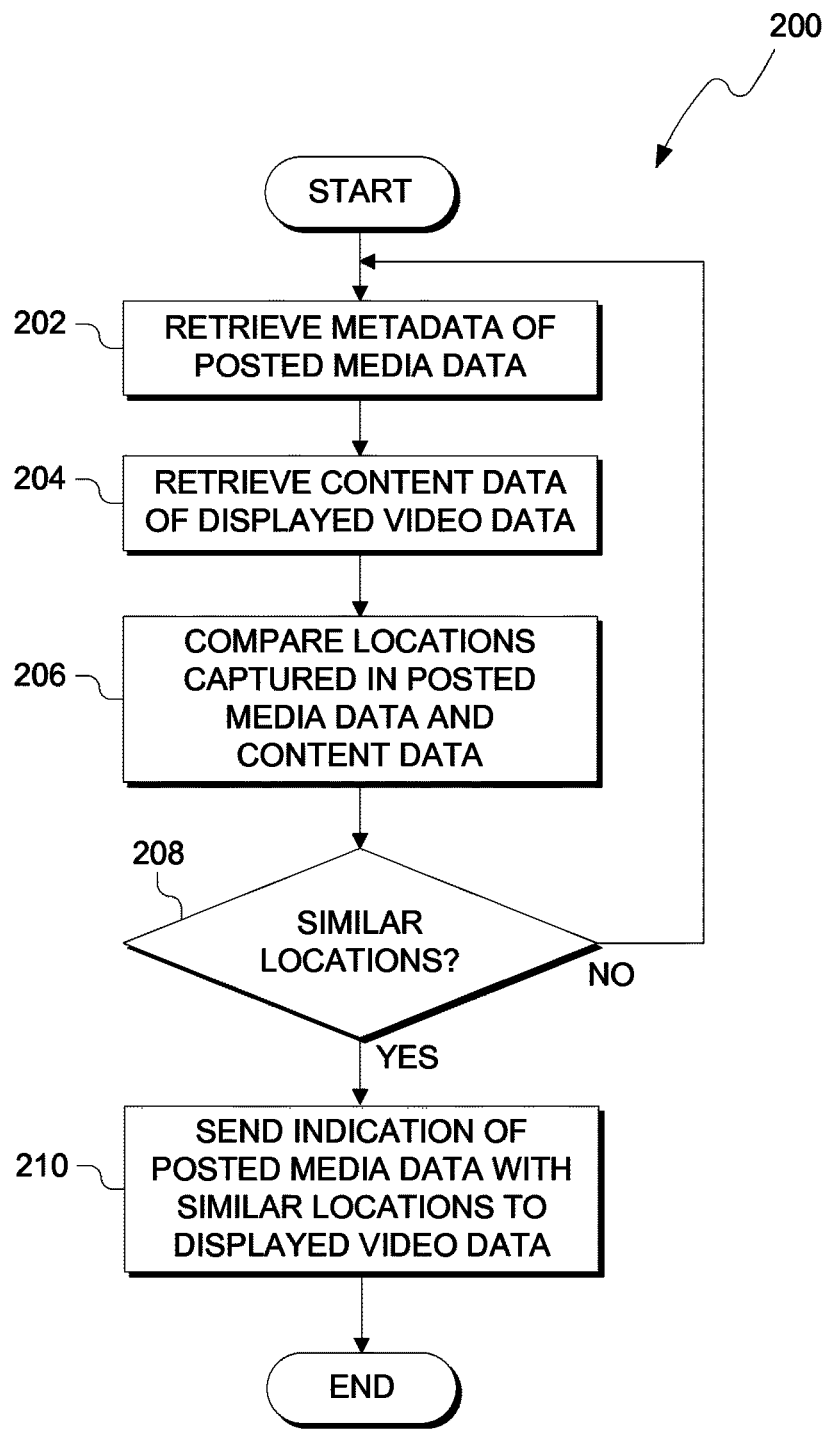
FIG. 2 illustrates operational processes of a notification program, on a computing device within the environment of FIG. 1, in accordance with an exemplary embodiment of the present invention.

FIG. 2 illustrates operational processes of notification programs 124. As video player programs 122 display video data 114 of a content provider, notification programs 124 compare the currently displayed content to user-generated content in posted media data 134. In process 202, the respective notification program (e.g., notification program 124a) retrieves metadata of the posted media data 134. The respective notification program (e.g., notification program 124a) of the respective user device (e.g., user device 120a) currently displaying a video from content provider 110 retrieves metadata of user-generated content stored in posted media data 134 of social media platform 130. For example, respective notification program (e.g., notification program 124a) retrieves location metadata indicating where user-generate content was captured. In some embodiments, the respective notification program 124 retrieves metadata for user-generated content from friends of the user or from member of a group the user belongs to, as indicated by profile data 136.

In process 204, the respective notification program (e.g., notification program 124a) retrieves 116 content data associated with the currently displayed video data 114 on the respective user device (e.g., user device 120a). Content data 116 includes descriptions and other indication of the content included in a video of video data 114. For example, content data 116 includes a description of a television program. In some embodiments, content data 116 includes the locations depicted or where video data 114 was captured. For example, a movie may be about situations occurring in one city or location, but was shot in another city or location.

In process 206, the respective notification program (e.g., notification program 124a) compares the locations indicated in metadata of posted media data 134 and content data 116 of currently displayed video data 114. In decision process 208, the respective notification program (e.g., notification program 124a) determines if the locations indicated in the user-generated content and the content data 116 of displayed video data 114 are similar. For example, notification program 124 determines an area associated with each location of the posted media data 134 and content data 116. If the areas overlap to within a threshold, then notification program 124 determines the locations to be similar. If the locations are not similar (NO branch of decision process 208), then the respective notification program (e.g., notification program 124a) continues to compare content data 116 of currently displayed video data 114 for similar locations to the metadata of posted media data 134. If the locations are similar (YES branch of decision process 208), then the respective notification program (e.g., notification program 124a) sends a command to display user-generated content to the respective video player program 122. The respective video player program 122 displays the matching posted media data 134 (process 210) (e.g., user-generated images from the same beach in a currently viewed episode) while the user views the video data 114 of content provider 110 which caused the match in similar user-generated content. In some embodiments, the respective notification program (e.g., notification program 124a) sends a command to the respective video player program (e.g., video player program 122a) to initiate the display of a notification as an overlay while the user views the similar video data 114. In other embodiments, the respective notification program (e.g., notification program 124a) sends a command to another device, such as a smartphone of the user, to generate a notification indicating the similar user-generated content of posted media data 134.

Figure 3:
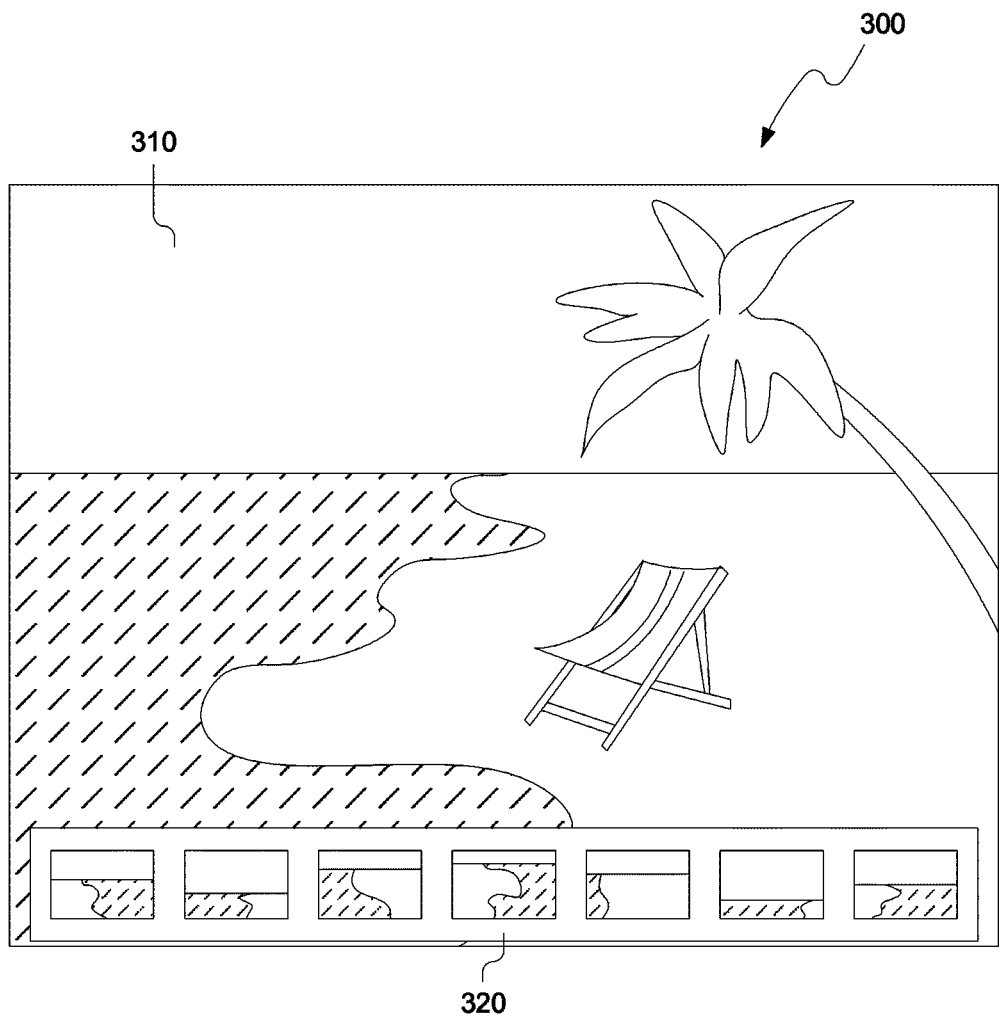
FIG. 3 depicts an example visualization of a notification program when user generated content matches content of video data.

FIG. 3 depicts an example visualization, generally designated 300, of notification program (e.g., notification program 124a) activity when a user generated content matches the content of video data 114. As a user selects video data 114 from content provider 110 to view, the respective video player program 122 displays the video content. In this example, visualization 300, displayed on video display 310, illustrates a displayed broadcast feed, on-demand video or other form of received video data 114. As video data 114 is displayed, the respective notification program 124 of the user device 120 compares content data 116 of the displayed video data 114 to the content of posted media data 134. If the content of both content data 116 and posted media data 134 match, then the respective notification program 124 displays the posted media data 134 to the user. Pop-up notification 320 is an example notification or indication the respective notification program 124 may display to alert the user of posted social media data 134 that shares similar content with the currently displayed video data 114.

In this example, pop-up notification 320 includes multiple instances of posted media data 134 that shares content with the displayed video data 114. Pop-up notification 320 includes multiple images taken from a similar location to the location the displayed video data 114 was shot from. In a first example, content data 116 associated with the displayed video data 114 includes a description of an episode of a travel program, which lists a particular beach. When a user views the episode, notification program 124 determines if content of posted media data 134 of social media platform 130 matches the content of the episode. In one scenario and embodiment, notification program 124 sends a request to media sharing program 132 to search for posted media data 134 that shares similar content posted by any user. In another scenario and embodiment, media sharing program 132 limits the search to contacts or friends of the user, as indicated by a profile of the user in profile data 136. Notification program 124 displays any posted media data 134 provided by media sharing program 132 that is similar to the displayed video data 114. As such, in continuation of the first example, media sharing program 132 provides images taken of the same beach. In one scenario, provided posted media data 134 includes metadata indicating the location the image was taken. In another scenario and embodiment, provided posted media data 134 includes a description or tags indicating the content of the images.

In some embodiments, notification program 124 compares content data 116 of displayed video data 114 to local media data 126 on the device of the user. For example, user device 120 includes one or more images or video captured by the user. As with posted media data 134, local media data 126 may include metadata or descriptions to indicate the content of the images or videos. When local media data 126 has similar content to the displayed video data 114, notification program 124 generates a notification to alert the user of local media data 126 that shares similar content to the displayed video data 114. Notification program 112 provides a user interface element to provide the user with an option to post the matching local media data 126 to social media platform 130. In one scenario, when a user posts the matching local media data 126 to social media platform 132, social media platform 132 shares the post to other users including the posted local media data 126 and the instance of video data 114 that initiated the notification (e.g., 'User' has posted an image from "Location" featured in "Show"). Furthermore, social media platform 132 may include links to one or more of the posted local media data 126 or the video data 114 matching the posted local media data 126.

Figure 4:
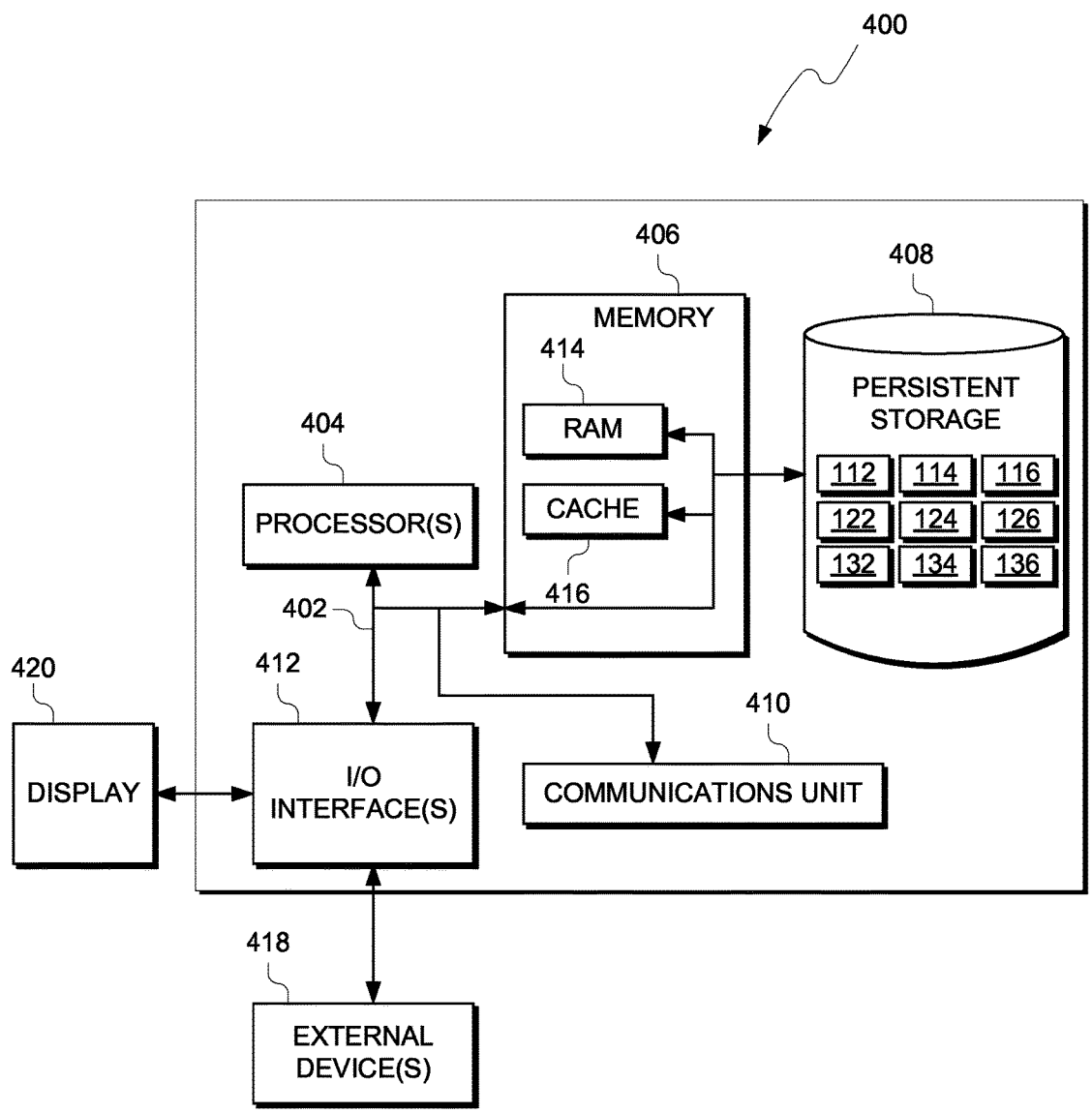
FIG. 4 depicts a block diagram of components of the computing device executing a notification program, in accordance with an exemplary embodiment of the present invention.

FIG. 4 depicts a block diagram, 400, of components for each of content provider 110, user devices 120 and social media platform 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Content provider 110, user devices 120 and social media platform 130 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Video distribution program 112, video data 114, content data 116, video player programs 122, notification programs 124, local media data 126, media sharing program 132, posted media data 134, and profile data 136 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 140. In these examples, communications unit 410 includes one or more network interface cards. Communications unit 410 may provide communications through the use of either or both physical and wireless communications links. Video distribution program 112, video data 114, content data 116, video player programs 122, notification programs 124, local media data 126, media sharing program 132, posted media data 134, and profile data 136 may be downloaded to persistent storage 408 through communications unit 410.

I/O interface(s) 412 allows for input and output of data with other devices that may be connected to Content provider 110, user devices 120 or social media platform 130. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., video distribution program 112, video data 114, content data 116, video player programs 122, notification programs 124, local media data 126, media sharing program 132, posted media data 134, and profile data 136, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method comprising:
   identifying, by one or more processors, a first content of a user-generated media, wherein the user-generated media includes an image file;
   identifying, by the one or more processors, a second content of a content-provider media, wherein (i) the content-provider media includes one or both of a broadcast stream and an on-demand video file and (ii) the content-provider media is currently being displayed for viewing by a user;
   determining, by the one or more processors, a location depicted in the first content based, at least in part, on metadata describing the first content;
   determining, by the one or more processors, a location depicted in the second content based, at least in part, on metadata describing the second content;
   responsive to a determination that the location depicted in the first content and the location depicted in the second content share a similar location, sending, by the one or more processors, a notification of the user-generated media to the user that is viewing the content-provider media; and
   responsive to receiving an indication of approval from the user in response to the notification, displaying, by the one or more processors, an overlay of the user-generated media on the content-provider media.

2. The method of claim 1, wherein the user-generated media is provided by one or more social network contacts of the user.

3. The method of claim 1, wherein the notification further includes information indicating the content of the content-provider media.

4. The method of claim 1, wherein the user-generated media is stored on a device of the user or on a social media platform.

5. The method of claim 1, the method further comprising:
   comparing, by the one or more processors, one or more images of the content-provider media to at least one image depicting a known location; and
   responsive to the comparison identifying that the second content of the content-provider media shares content with the at least one image depicting the known location, determining, by the one or more processors, the location depicted in the second content to be the known location depicted in the at least one image.

6. A computer program product comprising:
   one or more computer-readable storage media and program instructions stored on the one or more computer-readable storage media, the program instructions comprising:
   program instructions to identify a first content of a user-generated media, wherein the user-generated media includes an image file;
   program instructions to identify a second content of a content-provider media, wherein (i) the content-provider media includes one or both of a broadcast stream and an on-demand video file and (ii) the content-provider media is currently being displayed for viewing by a user;
   program instructions to determine a location depicted in the first content based, at least in part, on metadata describing the first content;
   program instructions to determine a location depicted in the second content based, at least in part, on metadata describing the second content;
   responsive to a determination that the location depicted in the first content and the location depicted in the second content share a similar location, program instructions to send a notification of the user-generated media to the user that is viewing the content-provider media; and
   responsive to receiving an indication of approval from the user in response to the notification, program instructions to display an overlay of the user-generated media on the content-provider media.

7. The computer program product of claim 6, wherein the user-generated media is provided by one or more social network contacts of the user.

8. The computer program product of claim 6, wherein the notification further includes information indicating the content of the content-provider media.

9. The computer program product of claim 6, wherein the user-generated media is stored on a device of the user or on a social media platform.

10. The computer program product of claim 6, the program instructions further comprising:
program instructions to compare one or more images of the content-provider media to at least one image depicting a known location; and
responsive to the comparison identifying that the second content of the content-provider media shares content with the at least one image depicting the known location, program instructions to determine the location depicted in the second content to be the known location depicted in the at least one image.

11. A computer system comprising:
one or more computer processors;
one or more computer readable storage media; and
program instructions stored on the computer readable storage media for execution by at least one of the one or more processors, the program instructions comprising:
program instructions to identify a first content of a user-generated media, wherein the user-generated media includes an image file;
program instructions to identify a second content of a content-provider media, wherein (i) the content-provider media includes one or both of a broadcast stream and an on-demand video file and (ii) the content-provider media is currently being displayed for viewing by a user;
program instructions to determine a location depicted in the first content based, at least in part, on metadata describing the first content;
program instructions to determine a location depicted in the second content based, at least in part, on metadata describing the second content;
responsive to a determination that the location depicted in the first content and the location depicted in the second content share a similar location, program instructions to send a notification of the user-generated media to the user that is viewing the content-provider media; and
responsive to receiving an indication of approval from the user in response to the notification, program instructions to display an overlay of for the user-generated media on the content-provider media.

12. The computer system of claim 11, wherein the user-generated media is provided by one or more social network contacts of the user.

13. The computer system of claim 11, wherein the notification further includes information indicating the content of the content-provider media.

14. The computer system of claim 11, the program instructions further comprising:
program instructions to compare one or more images of the content-provider media to at least one image depicting a known location; and
responsive to the comparison identifying that the second content of the content-provider media shares content with the at least one image depicting the known location, program instructions to determine the location depicted in the second content to be the known location depicted in the at least one image.

* * * * *